3,029,986
BLENDING APPARATUS FOR FREE-FLOWING GRANULAR MATERIALS
John D. Horn and Dayton R. Reem, Victoria, Tex., assignors to Union Carbide Corporation, a corporation of New York
Filed Mar. 21, 1960, Ser. No. 16,397
4 Claims. (Cl. 222—478)

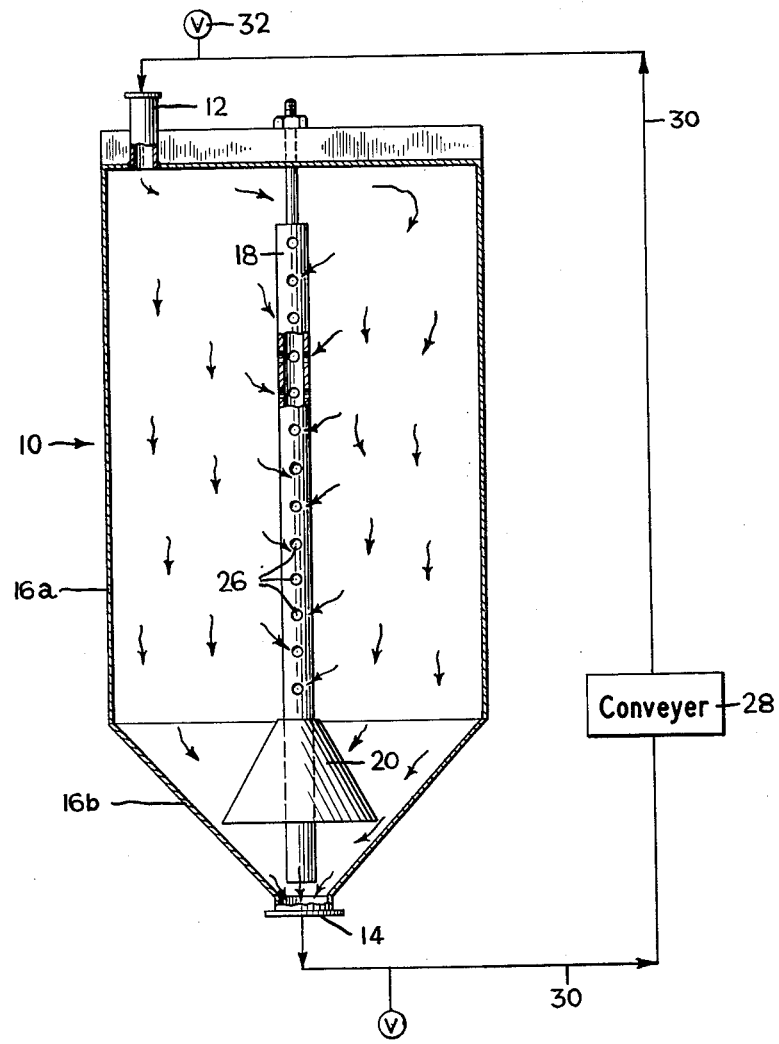

This invention relates to apparatus for blending free-flowing granular materials.

More particularly, it relates to apparatus comprising a hopper providing blended flow of centrally and peripherally disposed free-flowing granular material at the hopper outlet.

The need for adequate blending apparatus for granular products has long been recognized in the art, particularly for the blending of granular products such as synthetic resins and plastics, and the like, to achieve a uniform blend or mixture. Many of these products when produced vary on one side or the other of a set standard, and must be intimately blended with other similar components in order to minimize variations.

To produce an acceptably uniform blend in blending bins, it is necessary to intimately commingle all the component resins. Suitable equipment must positively intermix all the contents of the bin regardless of their respective proportions within the bin.

Heretofore, a disadvantage of bin blending systems has been that the resin flowing down the bin tends to flow faster down the center, over the outlet, thus causing slower mixing through non-uniform flow. The preferential flow of resin in the center of the bin creates stagnant pockets of resin against the bin walls.

It is an object, therefore, of the present invention to provide blending apparatus which by providing controlled and proportional flow from central and peripheral portions of the bin makes highly uniform blends of free-flowing granular materials.

Another object is to provide a storage bin modified to prevent coning or funnelling of material to the bin outlet whereby material entering the bin is blended with the other contents of the bin upon discharge therefrom without significant reduction in bin capacity or discharge rate.

Still another object is to provide apparatus which, when used in conjunction with recycling equipment, blends variable quantities of free flowing granular materials of varying pellet sizes to near homogeneity at a variety of recycle rates.

These and other objects are accomplished in accordance with the present invention by the use of a blending apparatus comprising a hopper having a centrally positioned fenestrated tube and a baffle means which defines an annular clearance with the hopper wall whereby total flow of material to the hopper outlet $F_T$ is the sum of flows through the fenestrated tube $F_t$ and the annular clearance $F_c$.

The invention can be better understood from the attached drawing wherein the single FIGURE is a sectional view, partly in elevation, of a preferred embodiment of the apparatus shown in conjunction with a conveyor means.

Referring to the figure the apparatus in detail comprises chamber 10 preferably of substantially circular horizontal cross-section which is representative of a silo, hopper, bin, tank or like storage structure for free flowing granular material. The chamber 10 is provided with inlet 12 at the top, an outlet 14 at the bottom and extending therebetween a wall comprising a substantially cylindrical upper wall 16a and a substantially conical lower wall 16b.

Mounted in the chamber 10 enclosed by upper wall 16a and lower wall 16b and substantially coaxial therewith is fenestrated tube 18 spaced above outlet 14 to provide a sufficient clearance between the lower end of fenestrated tube 18 and the outlet 14 to permit unimpeded flow of granular material therethrough. Positioned around fenestrated tube 18 is a baffle 20 shown as a divergent cone, whose peripheral edge cooperates with lower wall 16b to define an annular clearance through which an amount of granular material can flow unimpeded. The baffle 20 is suitably supported by the fenestrated tube 18 but can be supported by the bin walls by means of lateral members.

It is the principle of the present invention to achieve blending of free flowing granular materials disposed in a hopper by causing material in the center of the hopper to be intermixed with material at the walls of the hopper in controlled proportions. Proportioning is achieved by controlling the rate of flow of the central and peripheral portions of the stored material during discharge from the hopper. The flow of centrally disposed granular material in the blending action of the apparatus of this invention is exclusively through the fenestrated tube 18. The flow of peripherally disposed granular material is exclusively through the annular clearance defined by lower wall 16b and baffle 20. The ratio of the central and peripheral flows is the crux of the present invention. We have found that if the rate of flow $F_t$ of material to the outlet 14 from the fenestrated tube 18 is X, the rate of flow $F_c$ to the outlet 14 through the annular clearance must be at least 0.4X to achieve a fairly homogeneous blend and is preferably 2X for achieving the most homogeneous blends. Ratios of 4.5X and higher can also be used but with a slight sacrifice in degree of homogeneity being realized in the resulting blend. The rate of flow of peripherally disposed material $F_c$ is independent of the width of the clearance between baffle 20 and lower wall 16b within wide limits. The rate of flow of centrally disposed material $F_t$ from fenestrated tube 18 is dependent upon a number of factors or variables e.g. diameter of the tube, number of openings, vertical spacing of the openings, lateral spacing of the openings, size of the openings relative to the size of the pellets of granulated material, shape of the openings and head of material in the bin or hopper. These various factors will be considered individually below but it should be borne in mind that all the above mentioned factors are interdependent and interrelated; variation in one variable e.g. a decrease in the number of openings can necessitate similar or opposite adjustments in other variables e.g. increase in size of openings, and/or greater spacing of openings and/or decrease in pellet size of the granulated material.

Total resin flow is limited by the capacity of the conveyor used in conjunction with the apparatus. If the flow down the tube, fixed by the number and size of the openings of the tube and other factors mentioned above, is termed $F_t$ and total flow is $F_T$ the flow through the annular clearance $F_c$ is determined according to the equation $$F_c = F_T - F_t$$

Fenestrated tube 18 is an elongated member provided with a plurality of entrance means 26, sized to permit easy ingress of free-flowing granular material disposed thereabout without bridging. The size of entrance means 26 is determined by the particular granular material sought to be blended. In general the size of the opening should be at least about ten times the size of the individual pellets of the granulated material. The shape of entrance means 26 is not critical provided free flow of pellets is not impeded. Ease of fabrication will obviously make certain shapes e.g. circular or oval preferable. The entrance means 26 should be equidistantly spaced along substantially the entire length of the fenestrated tube 18 not covered by baffle 20 to insure sampling of all layers or portions of material in the bin. Similarly, to insure adequate and representative sampling the entrance means 26 should be regularly laterally spaced. As shown in the figure fenestrated tube 18 is provided with a great number of entrance means 26 vertically equidistantly spaced and laterally spaced around the tube. The variables in design of fenestrated tube 18 should be adjusted to permit easy and rapid flow of centrally disposed material from outlet 14.

The baffle 20 is made of rigid material and need not be any particular size. The purpose of the baffle 20 is to cooperate with lower wall 16b to define an annular space conforming to the above given requirements. The baffle 20 is suitably positioned at a point in the bin below substantially all of the entrance means 26 of fenestrated tube 18. A small baffle is to be preferred over a large one because the loss of storage volume consequent on the use of a baffle is thereby kept to a minimum. The slope of the upper surface of baffle 20 preferably forms an angle of 60° with the horizontal which renders the baffle 20 self-cleansing. A sloped surface on the baffle is desirable in order to provide self-cleaning properties and complete emptying of the bin. It is also desirable that the baffle be adjustably mounted on the fenestrated tube or within the bin so as to provide for changing of the annular clearance.

In the drawing, the apparatus of the invention is shown in conjunction with a conveying means, suitably a pneumatic conveyor 28 and ducts 30 which carry granular material from the outlet 14 past sampling point 32 to inlet 12 for recycle where desired for more homogeneous blending using only one bin.

The data of the following examples illustrate the results achieved with the apparatus of the present invention and the superiority thereof over unmodified hopper blending devices.

The apparatus used in these tests comprised a hopper having a diameter of twelve feet, a height of 35 feet and a capacity of 100,000 pounds of free flowing granular resin. The fenestrated tube was an eight inch diameter pipe about 33 feet long closed at the top and provided with four rows of entrance means laterally spaced 90° apart and equidistantly spaced vertically. On top of the resin was placed a layer of resin colored with household dye. Material was conveyed from the outlet to the inlet of the bin by a pneumatic conveyor having a 60,000 pounds per hour capacity. Samples were taken frequently during the blending time. Total weight of the sample was determined, then weight of the colored resin pellets to determine the weight percent thereof present. The closer the weight percent was to the maximum theoretical value the more uniform was the blend. In interpreting the test results, it is important to remember that placing all the different color resin at the top of the bin exceeds the worst blending condition likely to occur in actual use.

*Example 1*

A. To 100,000 pounds of resin having a ⅛" particle size in a bin equipped with fenestrated tube having 182 holes 1⅜ inches in diameter and a cone having a diameter of 6 feet were added, at the top of the bin, 876 pounds of colored resin, representing 0.876% by weight. This blend was mixed for 12 hours. After 3 hours of circulating through the blender of this invention, a stable colored resin distribution level of about 0.750% by weight was reached.

B. For comparison, a conventional blending operation was carried out by adding to the top of a bin 480 pounds of colored resin. The resin in this bin was mixed for 5 hours with resin from four other bins, the whole totaling 100,000 pounds, with an optimum distribution level of 0.480% by weight. In 5 hours of circulating with the conventional system, poor distribution was indicated by high peaks being attained during the first 2½ hours, followed by a leveling off to values between 0.05 to 2.75%, which was well below the desired value of 0.480%. This demonstrates the spotty and inadequate blending achieved with the conventional method.

*Example 2*

Three tests were made with the blender of this invention to determine the effect of tube flow rate with different numbers of holes in the tube. Conditions of the three tests were alike in that each employed (1) a recycle rate of 60,000 pounds per hour, (2) maximum homogeneity level of 1% by weight, (3) a cone diameter of six feet, and (4) a sample frequency of ten minutes. Results were as follows:

| No. of holes of 1.375" dia. in tube | Ratio—Tube: Annular Clearance | Percent Distribution at Hour Intervals | | | | | | | |
|---|---|---|---|---|---|---|---|---|---|
| | | 1 | 2 | 3 | 4 | 5 | 6 | 7 | 8 |
| 80 | 0.415 | 0.45 | 3.1 | 1.25 | 1.5 | 1.2 | 1.3 | 1.25 | 1.1 |
| 150 | 1.22 | 0.55 | 0.20 | 2.25 | 1.0 | 1.0 | 1.8 | 1.05 | 1.25 |
| 182 | 2.02 | 0.60 | 0.70 | 0.75 | 0.65 | 0.70 | 0.65 | 0.55 | 0.75 |

It is seen that higher ratios give faster blending with fewer peaks of concentration; that is, a greater homogeneity is attained.

*Example 3*

The results of the blending test of Example 2 were correlated with melt index as a representative property. The contaminant was assumed to have a melt index of 20.0 (the highest that might ordinarily be encountered), the remainder of the resin had a melt index of 2.0 and the upper specification limit on melt index of the blend was 2.5.

Results are given below:

| No. of holes of 1.375" dia. in tube | Ratio—Tube: Annular Clearance | Melt Index[1] at Hourly Intervals | | | | | | | |
|---|---|---|---|---|---|---|---|---|---|
| | | 1 | 2 | 3 | 4 | 5 | 6 | 7 | 8 |
| 80 | 0.415 | 2.08 | 2.56 | 2.22 | 2.3 | 2.22 | 2.21 | 2.23 | 2.2 |
| 150 | 1.22 | 2.1 | 2.05 | 2.4 | 2.18 | 2.22 | 2.32 | 2.18 | 2.24 |
| 182 | 2.02 | 2.11 | 2.14 | 2.14 | 2.11 | 2.12 | 2.12 | 2.1 | 2.1 |

[1] Melt index is given as decigram/minute as determined by ASTM Test Method 1238–52T.

What is claimed is:

1. Apparatus for blending free-flowing granular material comprising a hopper having a wall which converges toward and terminates in an outlet, and supported in said hopper spaced above said outlet, a substantially vertically positioned fenestrated tube with a diameter X and having a plurality of entrance means therein and a self-cleansing divergent baffle mounted below substantially all of said entrance means and constructed and arranged to cooperate with said wall to define an annular clearance with a diameter of at least 0.4X whereby the cross-sectional areas of said fenestrated tube and said annular clearance are proportioned so that the rate of flow of material disposed in said hopper to said outlet from said annular clearance is at least 0.4 times as great as the rate of flow of material from said fenestrated tube.

2. Apparatus for blending free-flowing granular material comprising a hopper having a wall which converges toward and terminates in an outlet, and supported in said hopper spaced above said outlet, a substantially vertically positioned fenestrated tube with a diameter X and having a plurality of entrance means therein and a self-cleansing divergent baffle mounted below substantially all of said entrance means and constructed and arranged to cooperate with said wall to define an annular clearance with a diameter of from 0.4X to about 4.5X whereby the cross-sectional areas of said fenestrated tube and said annular clearance are proportioned so that the rate of flow of material disposed in said hopper to said outlet from said annular clearance is from 0.4 to about 4.5 times as great as the rate of flow of material from said fenestrated tube.

3. Apparatus for blending free-flowing granular material comprising a hopper having a wall which converges toward and terminates in an outlet, and supported in said hopper spaced above said outlet, a substantially vertically positioned fenestrated tube with a diameter X and having a plurality of entrance means therein and a self-cleansing divergent baffle mounted below substantially all of said entrance means and constructed and arranged to co-operate with said wall to define an annular clearance with a diameter of about 2X whereby the cross-sectional areas of said fenestrated tube and said annular clearance are proportioned so that the rate of flow of material disposed in said hopper to said outlet from said annular clearance is about 2 times as great as the rate of flow of material from said fenestrated tube.

4. The apparatus claimed in claim 3 wherein said fenestrated tube has a plurality of entrance means spaced substantially equidistantly along its length and laterally.

References Cited in the file of this patent

UNITED STATES PATENTS

| | | |
|---|---|---|
| 1,819,756 | Reed | Aug. 18, 1931 |
| 1,991,720 | Barreda et al. | Feb. 19, 1935 |